(12) United States Patent
Yu et al.

(10) Patent No.: US 11,830,207 B2
(45) Date of Patent: Nov. 28, 2023

(54) METHOD, APPARATUS, ELECTRONIC DEVICE AND READABLE STORAGE MEDIUM FOR POINT CLOUD DATA PROCESSING

(71) Applicant: Beijing Baidu Netcom Science and Technology Co., Ltd., Beijing (CN)

(72) Inventors: Li Yu, Beijing (CN); Weixin Lu, Beijing (CN); Guowei Wan, Beijing (CN); Liang Peng, Beijing (CN); Shiyu Song, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 319 days.

(21) Appl. No.: 17/206,999

(22) Filed: Mar. 19, 2021

(65) Prior Publication Data

US 2021/0358213 A1 Nov. 18, 2021

(30) Foreign Application Priority Data

May 18, 2020 (CN) .......................... 202010420765.6

(51) Int. Cl.
*G06T 7/33* (2017.01)
*G06T 17/20* (2006.01)
(Continued)

(52) U.S. Cl.
CPC ................ *G06T 7/33* (2017.01); *G06F 18/22* (2023.01); *G06T 7/344* (2017.01); *G06T 17/20* (2013.01); *G06V 10/44* (2022.01)

(58) Field of Classification Search
CPC ........... G06T 7/33; G06T 7/344; G06T 17/20; G06T 2207/10028; G06T 2207/20081; G06T 2207/20084; G06T 2207/30252; G06F 18/22; G06F 18/213; G06V 10/44; G06V 10/757; G06N 3/045; G06N 3/08
See application file for complete search history.

(56) References Cited

FOREIGN PATENT DOCUMENTS

CN 110246166 A 9/2019
CN 107818598 B * 12/2020 ........... G06K 9/4671

OTHER PUBLICATIONS

Gojcic, Z., Zhou, C., Wegner, J.D. and Wieser, A., 2019. The perfect match: 3d point cloud matching with smoothed densities. In Proceedings of the IEEE/CVF conference on computer vision and pattern recognition (pp. 5545-5554).*

(Continued)

*Primary Examiner* — Zhitong Chen
(74) *Attorney, Agent, or Firm* — Kwan & Olynick LLP

(57) ABSTRACT

A method, an electronic device and a readable storage medium for point cloud data processing, which may be used for autonomous driving, are disclosed. The feature vectors of respective points in the first point cloud data and second point cloud data are pre-learned, and thus the feature vectors of the first key points may be determined directly based on the learnt second feature vectors of respective first neighboring points of the respective first key points in the first point cloud data, and the feature vectors of the candidate key points may be determined directly based on the learnt third feature vectors of the respective second neighboring points of respective candidate key points in the second point cloud data corresponding to the first key points.

20 Claims, 2 Drawing Sheets

(51) Int. Cl.
   *G06F 18/22*   (2023.01)
   *G06V 10/44*   (2022.01)

(56) References Cited

OTHER PUBLICATIONS

Zeng, A., Song, S., Nießner, M., Fisher, M., Xiao, J. and Funkhouser, T., 2017. 3dmatch: Learning local geometric descriptors from rgb-d reconstructions. In Proceedings of the IEEE conference on computer vision and pattern recognition (pp. 1802-1811).*

Extended European Search Report Issued in European Patent Application No. 21163480.3, dated Sep. 23, 2021, 52 Pages.

* cited by examiner

METHOD, APPARATUS, ELECTRONIC DEVICE AND READABLE STORAGE MEDIUM FOR POINT CLOUD DATA PROCESSING

The present application claims the priority and benefit of Chinese Patent Application No. 202010420765.6, filed on May 18, 2020, entitled "METHOD, APPARATUS, ELECTRONIC DEVICE AND READABLE STORAGE MEDIUM FOR POINT CLOUD DATA PROCESSING". The disclosure of the above application is incorporated herein by reference in its entirety.

TECHNICAL FIELD

The present disclosure relates to computer technologies, particularly to computer vision technology, and more particularly to a method, an apparatus, an electronic device and a readable storage medium for point cloud data processing.

BACKGROUND

Point cloud data is a set of point data of an external surface of an object obtained by a measurement instrument, and is a digitalized representation form of the real world. Point cloud data is of very strong application value in the fields such as building protection, 3D map and biomedicine. Point cloud registration is a fundamental technology in the 3D vision field, and it aims to unify point cloud data collected from different view angles in a designated coordinate system by calculating its relative posture.

Since the point cloud registration technology is an important technique employed in a fundamental part (namely, point cloud registration) during application of the point cloud data, the efficiency of the point cloud registration technology is crucial to the application of the point cloud data.

SUMMARY

A plurality of embodiments of the present disclosure provide a method, an apparatus, an electronic device and a readable storage medium for point cloud data processing, to improve the efficiency of the point cloud registration.

In an embodiment, it is proposed a method for point cloud data processing which includes:
  obtaining first feature vectors of respective points in first point cloud data, and determining one or more first key points in the respective points in the first point cloud data according to the first feature vectors of said respective points;
  obtaining second key points in second point cloud data corresponding respectively to respective first key points in the one or more first key points, according to the one or more first key points and a preset first conversion parameter between the second point cloud data and the first point cloud data; where the first point cloud data and the second point cloud data are point cloud data of a same scenario obtained from different view angles;
  determining a first preset number of first neighboring points of each of the first key points according to the first point cloud data, and obtaining a fourth feature vector of each of the first key points according to a second feature vector of each of the first neighboring points of each of the first key points;
  determining a second preset number of candidate key points of each of the second key points corresponding to each of the first key points according to a preset search radius and a preset grid size; determining a first preset number of second neighboring points of each of the candidate key points according to the second point cloud data, and obtaining a fifth feature vector of each of the candidate key points according to a third feature vector of each of the second neighboring points of each of the candidate key points;
  determining a matching point registered by each of the first key points, according to the fourth feature vector of each of the first key points and the fifth feature vector of each of the candidate key points.

According to an embodiment, before the obtaining a fourth feature vector of each of the first key points according to a second feature vector of each of the first neighboring points of each of the first key points, the method may further include:
  obtaining the second feature vector of each of the first neighboring points of each of the first key points according to the first point cloud data by using a pre-created feature model.

According to an embodiment, before the obtaining a fifth feature vector of each of the candidate key points according to a third feature vector of each of the second neighboring points of each of the candidate key points, the method may further include:
  obtaining the fifth feature vector of each of the candidate key points according to the second point cloud data by using a pre-created feature model.

According to an embodiment, the determining a second preset number of candidate key points of each of the second key points corresponding to each of the first key points according to a preset search radius and a preset grid size may include:
  determining a search space of each of the second key points according to the preset search radius by taking grid voxels closest to each of the second key points as a search center of each of the second key points, where grid voxels in the second point cloud data are determined according to the preset grid size; and
  determining central points of the second preset number of grid voxels in the search space of each of the second key points, as the candidate key points of each of the second key points corresponding to each of the first key points.

According to an embodiment, the determining a second preset number of candidate key points of each of the second key points corresponding to each of the first key points according to a preset search radius and a preset grid size may include:
  determining a repeated search space according to the search space of each of the second key points; and
  determining central points of the second preset number of grid voxels in the repeated search space as candidate key points of two or more second key points.

According to an embodiment: the determining a second preset number of candidate key points of each of the second key points corresponding to each of the first key points according to a preset search radius and a preset grid size may include:
  determining a search space of each of the second key points according to the preset search radius by taking each of the second key points as a search center of each of the second key points;

determining the second preset number of grid voxels according to the preset grid size in the search space of each of the second key points; and determining central points of the second preset number of grid voxels as the candidate key points of each of the second key points corresponding to each of the first key points.

According to an embodiment, the determining a matching point registered by each of the first key points, according to the fourth feature vectors of each of the first key points and the fifth feature vectors of each of the candidate key points may include:

obtaining a similarity between each of the candidate key points of each of the second key points and each of the first key points corresponding to each of the second key points, according to the fourth feature vector of each of the first key points and the fifth feature vector of each of the candidate key points; and determining the matching point registered by each of the first key points according to the similarity between each of the candidate key points of each of the second key points and each of the first key points corresponding to each of the second key points and each of the candidate key points.

In an embodiment, it is proposed an apparatus for point cloud data processing which includes:

a key point determining unit configured to obtain first feature vectors of respective points in first point cloud data, and determine one or more first key points in the respective points in the first point cloud data according to the first feature vectors of said respective points;

a key point converting unit configured to, obtain second key points in the second point cloud data corresponding respectively to respective first key points in the one or more key points, according to the one or more first key points and a preset first conversion parameter between the second point cloud data and the first point cloud data; where the first point cloud data and the second point cloud data are point cloud data of a same scenario obtained from different view angles;

a key point feature unit configured to determine a first preset number of first neighboring points of each of the first key points according to the first point cloud data, and obtain a fourth feature vector of each of the first key points according to a second feature vector of each of the first neighboring points of each of the first key points;

a candidate key point feature unit configured to determine a second preset number of candidate key points of each of the second key points corresponding to each of the first key points according to a preset search radius and a preset grid size; determine a first preset number of second neighboring points of each of the candidate key points according to the second point cloud data, and obtain a fifth feature vector of each of the candidate key points according to a third feature vector of each of the second neighboring points of each of the candidate key points;

a matching point determining unit configured to determine a matching point registered by each of the first key points, according to the fourth feature vectors of each of the first key points and the fifth feature vector of each of the candidate key points.

According to an embodiment, the key point feature unit may be further configured to:

obtain the second feature vector of each of the first neighboring points of each of the first key points according to the first point cloud data by using a pre-created feature model.

According to an embodiment, the candidate key point feature unit may be further configured to:

obtain the fifth feature vector of each of the candidate key points according to the second point cloud data by using a pre-created feature model.

According to an embodiment, the candidate key point feature unit may be specifically configured to:

determine a search space of each of the second key points according to the preset search radius by taking grid voxels closest to each of the second key points as a search center of each of the second key points, where grid voxels in the second point cloud data are determined according to the preset grid size; and determine central points of the second preset number of grid voxels in the search space of each of the second key points, as the candidate key points of each of the second key points corresponding to each of the first key points.

According to an embodiment, the candidate key point feature unit may be specifically configured to:

determine a repeated search space according to the search space of each of the second key points; and determine central points of the second preset number of grid voxels in the repeated search space as candidate key points of two or more second key points.

According to an embodiment, the candidate key point feature unit may be specifically configured to:

determine a search space of each of the second key points according to the preset search radius by taking each of the second key points as a search center of each of the second key points;

determine the second preset number of grid voxels according to the preset grid size in the search space of each of the second key points; and determine central points of the second preset number of grid voxels as the candidate key points of each of the second key points corresponding to each of the first key points.

According to an embodiment, the matching point determining unit is specifically configured to:

obtain a similarity between each of the candidate key points of each of the second key points and each of the first key points corresponding to each of the second key points, according to the fourth feature vector of each of the first key points and the fifth feature vector of each of the candidate key points; and determine the matching point registered by each of the first key points according to the similarity between each of the candidate key points of each of the second key points and each of the first key points corresponding to each of the second key points and each of the candidate key points.

In an embodiment, it is proposed an electronic device which include:

at least one processor; and a memory communicatively connected with the at least one processor; where, the memory stores instructions executable by the at least one processor, and the instructions are executed by the at least one processor to enable the at least one processor to perform the method according to above aspect and any possible implementation.

In an embodiment, it is proposed a non-transitory computer-readable storage medium storing computer instructions therein, where the computer instructions are used to cause the computer to perform the method according to above aspect and any possible implementation.

BRIEF DESCRIPTION OF THE DRAWINGS

In order to more clearly illustrate the technical solutions in the embodiments of the present disclosure, figures to be used for describing the embodiments or the prior art will be briefly introduced below. Obviously, the figures described below illustrate some embodiments of the present disclosure. Those having ordinary skilled in the art appreciate that other figures may be obtained according to these figures without making any inventive efforts. The figures are only used to facilitate better understanding of the technical solutions and cannot be construed as limiting the present disclosure. In the figures.

DETAILED DESCRIPTION OF EMBODIMENTS

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Apparently, embodiments described here are only partial embodiments of the present disclosure, not all embodiments. Based on embodiments in the present disclosure, all other embodiments obtained by those having ordinary skill in the art without making inventive efforts all fall within the protection scope of the present disclosure.

It is to be noted that the terminal involved in the embodiments of the present disclosure may include but is not limited to a mobile phone, a Personal Digital Assistant (PDA), a wireless handheld device, a Tablet Computer, a Personal Computer (PC), a MP3 player, a MP4 player, a wearable device (e.g., smart glasses, a smart watch, a smart bracelet, etc.), etc.

In addition, it should be appreciated that the term "and/or" used in the text herein is only an association relationship depicting associated objects and represents that three relations might exist, for example, A and/or B may represents three cases, namely, A exists individually, both A and B coexist, and B exists individually. In addition, the symbol "/" in the text generally indicates that associated objects before and after the symbol are in an "or" relationship.

Figure 1:
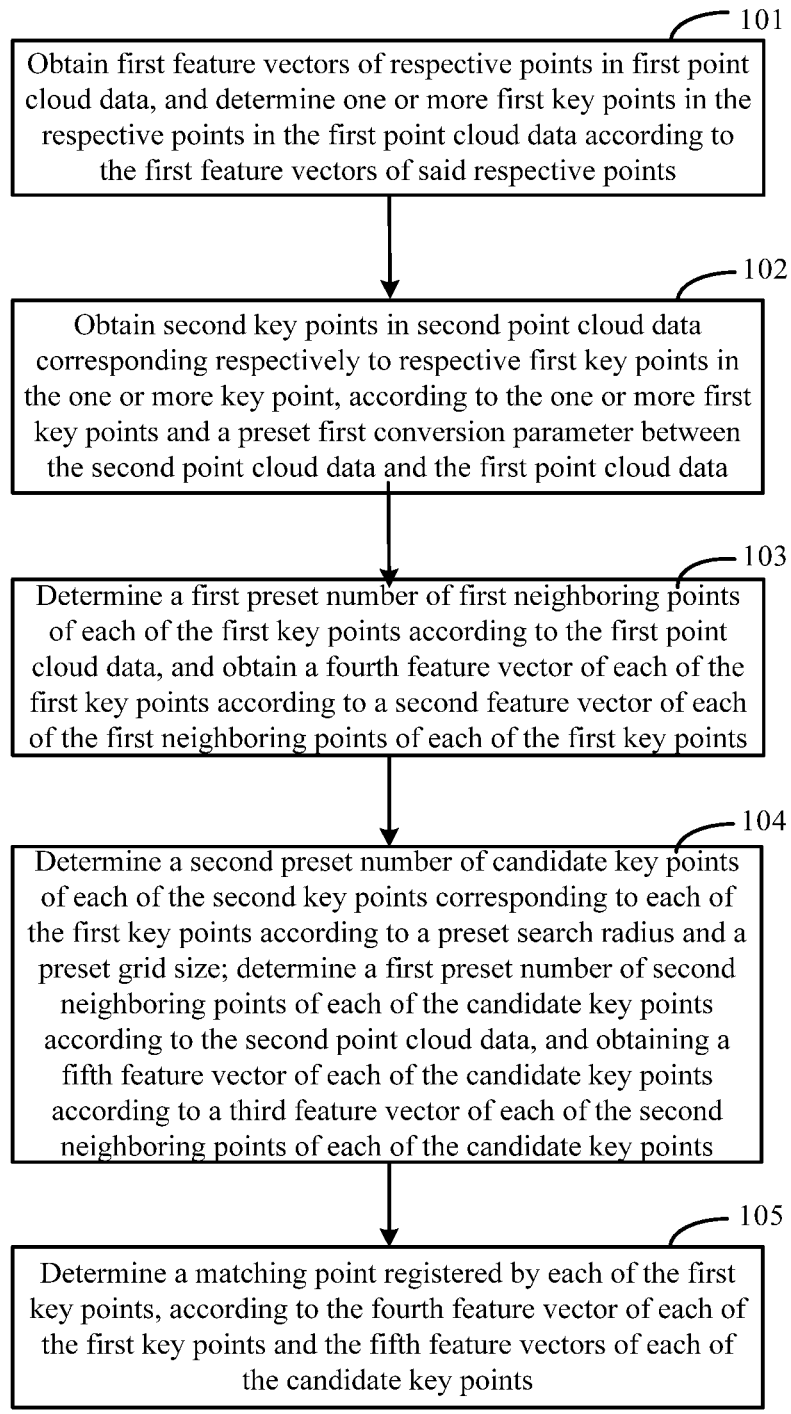
FIG. 1 is a flowchart of a method for point cloud data processing according to an embodiment of the present disclosure.

FIG. 1 is a flowchart of a method for point cloud data processing according to an embodiment of the present disclosure. As shown in FIG. 1, the method may include the following steps:

101: obtaining first feature vectors of respective points in first point cloud data, and determining one or more first key points in respective points in the first point cloud data according to the first feature vectors of said respective points.

102: obtaining second key points in second point cloud data corresponding respectively to respective first key points in the one or more first key points, according to the one or more first key points and a preset first conversion parameter between the second point cloud data and the first point cloud data.

The first point cloud data and the second point cloud data are point cloud data of a same scenario obtained from different view angles.

103: determining a first preset number of first neighboring points of each of the first key points according to the first point cloud data, and obtaining a fourth feature vector of each of the first key points according to a second feature vector of each of the first neighboring points of each of the first key points.

104: determining a second preset number of candidate key points of each of the second key points corresponding to each of the first key points according to a preset search radius and a preset grid size; determining a first preset number of second neighboring points of each of the candidate key points according to the second point cloud data, and obtaining a fifth feature vector of each of the candidate key points according to a third feature vector of each of the second neighboring points of each of the candidate key points.

105: determining a matching point registered by each of the first key points, according to the fourth feature vector of each of the first key points and the fifth feature vector of each of the candidate key points.

It is to be noted that part or all of a subject for implementing 101-105 may be an application located at a local terminal, or be a function unit such as a plug-in or Software Development Kit (SDK) arranged in the application located at the local terminal, or be a processing engine located in a network-side server, or be a distributed system located on the network side, for example, a processing engine or a distributed system in a processing platform on the network side. This is not particularly limited in the embodiment.

It may be understood that the application may be a native application (nativeAPP) installed on the terminal, or a web application (webAPP) of a browser on the terminal. This is not limited in the embodiment.

As such, by pre-learning the feature vectors of respective points in the first point cloud data and second point cloud data, the feature vectors of the first key points is determined directly based on the learnt second feature vectors of respective first neighboring points of the respective first key points in the first point cloud data, and the feature vectors of the candidate key points may be determine directly based on the learnt third feature vectors of the respective second neighboring points of respective candidate key points in the second point cloud data corresponding to the first key points. Therefore, there is no need to learn the feature vectors of the first key points according to respective first key points and their first neighboring points in the first point cloud data, or to learn the feature vectors of the candidate key points according to the respective candidate key points and their second neighboring points in the second point cloud data corresponding to the first key points. The number of points to be learnt may be effectively reduced and the efficiency of point cloud registration may be improved.

In some embodiments, the first point cloud data and the second point cloud data may be point cloud data of a same scenario obtained from different view angles. In some specific scenarios, the first point cloud data may be referred to as source point cloud data, and the second point cloud data may be referred to as target point cloud data. The first point cloud data and the second point cloud data may be collected by a point cloud collecting device at a fixed posture. An electronic device on which the method for point cloud data processing is performed may obtain the first feature vectors of respective points in the first point cloud data from the local or from other electronic devices. The first feature vectors may be obtained by the subject for implementing the method itself or other electronic devices by extracting the first point cloud data with various feature extraction algorithms.

For example, specifically, the first point cloud data may be input into a pre-trained feature extracting model to obtain the feature vectors of the points.

In an implementation, the above feature extracting model is used to characterize a correspondence relationship between points in the point cloud data and feature vectors. For example, the first point cloud data may be input into the feature extracting model to obtain the feature vectors of respective points in the point cloud data, which may be referred to as semantic feature vectors. It is possible to, based on the first key points selected by the semantic feature vectors, automatically avoid the moving object and preferably select points whose morphology facilitates matching, for example, a wall corner or tree chunk. The feature extracting model may be an artificial neural network which abstracts a human brain neuron network from perspective of information processing, establishes a certain simple model and forms different networks in different connection manners. The artificial neural network is usually formed with a lot of nodes (or called neurons) being connected to one another, and each node represents a specific output function referred to as an excitation function. The connection between every two nodes represents a weight value referred to as weight (also called parameter) for a signal through the connection, and the output of the network varies with the connection manner of the network, the weight value and the excitation function. The artificial neural network usually includes a plurality of layers, and each layer include a plurality of nodes. Usually, the weights of the nodes of a same layer may be the same, and the weights of nodes of different layers may be different, and thus the parameters of the multiple layers of the artificial neural network may also be different. Here, the first point cloud data may be input from an input side of the artificial neural network, be subjected to processing (e.g., multiplication, convolution etc.) of parameters of respective layers in the artificial neural network, and be output from an output side of the artificial neural network. The information output from the output side is the first feature vectors of respective points.

In some specific application scenarios, the feature extracting model may be PointNet++. The PointNet++ is an improved version of PointNet. A basic idea of PointNet is to learn the feature vector corresponding to each point in the input point cloud data, and then use the feature vectors of all points to obtain a global point cloud feature. Here PointNet lacks extraction and processing of local features and does not consider local sparsity of the point cloud data. PointNet++ makes improvements with respect to the above problem, and solves two problems: how to perform local division on the point cloud and how to perform local feature extraction on the point cloud. PointNet++ is a network structure proposed by authors Charles R. Qi and Hao Su. The structure of PointNet++ is at the topmost level in respect of 3D point cloud data, solves the problem about how to handle uneven sampling, also considers the distance metrics between points in the space, and learns features using local area information through a hierarchical structure. The network structure is more effective and more robust.

After the first feature vectors of respective points in the first point cloud data are obtained, one or more first key points in the first point cloud data may be determined according to the first feature vectors of respective points in the first point cloud data.

In this embodiment, the first key points may include points having some specific features which may better facilitate point cloud registration. For example, the first key points may include a feature point of a static object.

For example, after the first feature vectors of respective points in the first point cloud data are obtained, dimension reduction processing may be performed on the first feature vectors to determine the weights of points in the first point cloud data, and then the first key point of the first point cloud data may be determined according to the weights of points in the first point cloud data.

In the embodiment, dimension reduction processing may be specifically performed on the first feature vectors in many ways, for example, passing the first feature vectors through Multi-Layer Perceptrons (MLP), perform down-sampling on the first feature vectors, or inputting the first feature vectors into a convolutional layer with a smaller number of convolution kernels. After dimension reduction processing is performed on the first feature vectors, the weights of respective points may be determined according to the first feature vectors after the dimension reduction processing. The first key point therein is determined according to weights of respective points.

For example, the weights of respective points in the first point cloud data may be determined by the following steps: inputting the first feature vectors into a pre-created key point determining model to obtain one-dimensional feature vectors of the first point cloud data; taking values in the one-dimensional feature vectors as the weights of points in the first point cloud data. The key point determining model may include but not limited to the Multi-Layer Perceptrons (MLP). This is not particularly limited in the embodiment.

For example, the first key point may be determined by the following steps: sorting the weights in a descending order; determining points corresponding to a preset number of weights ranking top in the sequence as the first key points of the first point cloud data.

In an implementation, since the first point cloud data and the second point cloud data are point cloud data of a same scenario obtained from different view angles, the first point cloud data and the second point cloud data may be unified in a same coordinate system according to conversion parameters (R, T) between the coordinate system where the first point cloud data lies and the coordinate system where the second point cloud data lies. R is a rotation matrix of the two coordinate systems, and T is a translation vector between the two coordinate systems. In the embodiment, the preset first conversion parameter may be calculated according to the posture of the point cloud collecting device. The coordinates of respective first key points may be multiplied by the first conversion parameter to obtain respective second key points in the second point cloud data corresponding to respective first key points.

Alternatively, in some other scenarios, the second point cloud data may also be referred to as source point cloud data, and the first point cloud data may also be referred to as target point cloud data. The foregoing operations are similar to those in the foregoing scenario.

After the respective first key points in the first point cloud data and the second key points in the second point cloud data corresponding to the first key points are obtained, matching points registered by the respective first key points may be determined according to the respective first key points and second key points corresponding to the first key points. The technical solution in the following implementation may be employed.

After the respective first key points in the first point cloud data and the second key points in the second point cloud data corresponding to the first key points are obtained, matching points registered by the respective first key points may be specifically determined according to the one or more first key points, one or more second key points and a pre-created matching point generating model.

The above matching point generating model is used to characterize a relationship among the one or more first key points, the one or more second key points and the matching points. Furthermore, the above-mentioned matching point generating model may be further used to characterize a correspondence relationship between the first feature vectors, the one or more first key points, the one or more second key points and the matching points.

In the embodiment, the matching point generating model may be a list, and the above list includes the correspondence relationship among the first feature vectors, the one or more first key points, the one or more second key points and the matching points. For example, the above list may be retrieved based on the first feature vectors, the one or more first key points and the one or more second key points, and the corresponding matching points may be output.

The above-mentioned matching point generating model may also be a neural network. The first feature vectors, the one or more first key points and the one or more second key points may be input from an input side of the neural network, and output from an output side of the neural network after being processed through processing layers of the neural network (e.g., a convolutional layer, a pooling layer, etc.), to obtain the matching points.

The above matching point generating model can also be a combination of the neural network and the list. The above neural network may be used to extract features of the input data. Specifically, the first feature vectors, the one or more first key points and the one or more second key points may be input from an input side of the neural network, and output from an output side of the neural network after being processed through processing layers of the neural network (e.g., a convolutional layer, a pooling layer, etc.), to obtain feature data. Then, a list including a correspondence relationship between the feature data and the matching points is retrieved to obtain the matching points.

In the embodiment, the above matching points are points registered with respective first key points. They might totally be points in the second point cloud data, or might partially be points in the second point cloud data, or might totally not be points in the second point cloud data, which is not particularly limited in this embodiment.

After the matching points are obtained, registration processing may be performed on the first point cloud data and second point cloud data according to the at least one first key point and at least one matching point registered by the at least one first key point.

According to the method of the embodiment, the matching points registered by key points in the first point cloud data may be generated to thereby improve the precision of registration of the first point cloud data and the second point cloud data.

In a specific implementation, after the respective first key points in the first point cloud data and the second key points in the second point cloud data corresponding to the first key points are obtained, the process of the embodiment determining the matching points may include the following steps a-d:

Step a: for each of the first key points, determining a first preset number of first neighboring points of each of the first key points according to the first point cloud data.

For example, distances between points in the first point cloud data and the first key points may be determined firstly, then the obtained distances may be sorted in an ascending order, and a first preset number of points ranking top in the sequence is taken as first neighboring points of the first key points.

For example, the first key point is taken as a center, a neighborhood space of the first key point is determined according to a preset neighborhood distance, and then the points in the neighborhood space are taken as the first neighboring points of the first key point. For each first key point, the first key point may be taken as a center, and the neighborhood space of the first key point is determined by taking the preset neighborhood distance as a radius. For example, the neighborhood space is a sphere. Then, the points in the neighborhood space may be taken as the first neighboring points of the first key point.

After the neighborhood space of the first key point is determined, determination may be further made as to whether the number of points in the neighborhood space is smaller than a first preset number. In response to determining that the number of points in the proximity space is smaller than the first preset number, the points may be directly regarded as null points, or at least one point in the neighborhood space may be duplicated so that the number of points in the neighborhood space after the duplication is equal to the first preset number. Specifically, after the neighborhood space of the first key point is determined, judgment may be first made as to whether the number of points in the neighborhood space is smaller than the first preset number. If the number of points in the neighborhood space is smaller than the first preset number, the points may be directly regarded as null points, or at least one point in the neighborhood space may be duplicated so that the number of points in the neighborhood space after the duplication is equal to the first preset number. It may be understood that the duplication here may be completed at one time or at multiple times. The number of points to be duplicated is a difference between the first preset number and the number of points in the neighborhood space before duplication.

Step b: for the second key points corresponding to the respective first key points, determining a second preset number of candidate key points of each of the second key points corresponding to each of the first key points according to a preset search radius and a preset grid size; determining a first preset number of second neighboring points of each of the candidate key points in the second preset number of candidate key points according to the second point cloud data.

At this time, due to a collection error existing in the point cloud collecting device, or due to an error in the conversion parameter calculated according to the location of the point cloud collecting device, it might be possible that the second key points are not points actually existing in the second point cloud data. To determine more precise matching points, the candidate key points may be first determined here, and the matching points may be determined according to the candidate key points.

In this step, for the second key points corresponding to the first key points, the second preset number of candidate key points of the second key points may be first determined according to a preset search radius and a preset grid size. A specific manner of determining the candidate key points may include the following two manners:

Manner 1: determining a search space of each of the second key points according to the preset search radius by taking the second key points as search centers of the second key points; determining the second preset number of grid voxels according to the grid size in the search space of each of the second key points; and determining central points of the second preset number of grid voxels as the candidate key points of the second key points corresponding to the first key points.

Specifically, the search space may be determined according to the search radius. Then, in the search space, the second key point is taken as the central point, and points at a distance of an integer multiple of the grid size from the second key point are taken as the candidate key points of the second key point.

For example, the second key points corresponding to the first key points are taken as a search center, the search spaces of the second key points are determined according to the search radius, and then the second preset number of grid voxels are determined in the search space with the grid size as an edge length. Then, the central points of the grid voxels in the second preset number of grid voxels are taken as the candidate key points of the second key points. For each second key point, the second key point may be taken as the search center, and then the search space of the second key point may be determined according to the search radius. The search space is a sphere. Then, the second preset number of grid voxels are determined in the search space with the grid size as an edge length. Then, the central point of each grid voxel is taken as the candidate key point of the second key point.

In this manner, a repeated search space may be further determined according to the search spaces of the second key points, then de-duplicating processing of the candidate key points of the second key point may be performed based on the repeated search space, and the central points of the second preset number of grid voxels in the repeated search space may be determined as candidate key points for two or more second key points.

Manner 2: determining a search space of each of the second key points according to the preset search radius by taking grid voxels closest to each of the second key points as a search center of each of the second key points, where grid voxels in the second point cloud data are determined according to the grid size; and determining central points of the second preset number of grid voxels in the search space of each of the second key points, as the candidate key points of each of the second key points corresponding to each of the first key points.

Specifically, the search space may be determined according to the search radius. In the search space, a point closest to the second key point is taken as the central point, and points at a distance of an integer multiple of the grid size from the central point are taken as the candidate key points of the second key point.

For example, the point closest to the second key point corresponding to each first key point is taken as the search center, the search space of each second key point is determined according to the search radius, and then the second preset number of grid voxels are determined in the search space with the grid size as an edge length. Then, central points of grid voxels in the second preset number of grid voxels may be regarded as the candidate key points of the second key point. For each second key point, the second key point may be taken as the search center, and then the search space of the second key point may be determined according to the search radius. The search space is a sphere. Then, the second preset number of grid voxels are determined in the search space with the grid size as an edge length. Then, the central point of each grid voxel is taken as the candidate key point of the second key point.

In the above two manners, after the candidate key points of the second key points are obtained, a first preset number of second neighboring points of candidate key points in the second preset number of candidate key points may be determined according to the second point cloud data.

In the embodiment, the manner of determining the second neighboring points may be the same as that of determining the first neighboring points. For each second key point, the second key point may be taken as the search center, and the neighborhood space of the second key point may be determined with a preset neighborhood distance as a radius. Specifically, the neighborhood space is a sphere. Then, the points in the neighborhood space may be taken as the second neighboring points of the second key point.

Step c: obtaining the second feature vector of each of the first neighboring points according to each of the first neighboring points; obtaining the third feature vector of each of the second neighboring points according to each of the second neighboring points.

After the first neighboring points and second neighboring points are determined, second feature vectors of the first neighboring points may be specifically obtained according to the first neighboring points; third feature vectors of the second neighboring points may be obtained according to the second neighboring points.

Specifically, feature vectors of points of the first point cloud data may be obtained according to the first point cloud data by using a pre-created feature model, and feature vectors of points of the second point cloud data may be obtained according to the second point cloud data by using the pre-created feature model.

For example, the first point cloud data may be specifically input into a pre-trained feature model to obtain feature vectors of points.

In an implementation, the feature extracting model is used to characterize the correspondence relationship between the points in the point cloud data and the feature vectors. Specifically, the first point cloud data may be input into the feature model to obtain feature vectors of the points in the point cloud data. Here, local features of the first point cloud data and second point cloud data are further extracted through the feature model to obtain more detailed feature vectors which may be referred to as matching feature vectors or geometrical feature vectors here. Points having deep-level features and facilitating matching can be selected based on the matching points selected by the matching feature vectors. The feature model may be an artificial neural network. Hence, the first point cloud data may be input from an input side of the artificial neural network, be subjected to processing (e.g., multiplication, convolution etc.) of parameters of respective layers in the artificial neural network, and be output from an output side of the artificial neural network. The information output from the output side is the feature vectors of respective points.

The local features of the first point cloud data and second point cloud data are further extracted through a feature extracting sub-model to obtain more detailed feature vectors which may be referred to as geometrical feature vectors here. These feature vectors may be represented more completely as the first point cloud.

In some specific application scenarios, the feature model may be PointNet or PointNet++.

Similarly, the feature vectors of points in the second point cloud data may be obtained by the same method.

After the feature vectors of points in the first point cloud data and the feature vectors of points in the second point cloud data are obtained, these feature vectors may be stored. As such, after the first neighboring points and second neighboring points are determined, second feature vectors of the first neighboring points corresponding to the first neighboring points may be obtained according to the first neighboring points, and third feature vectors of the second neighboring points corresponding to the second neighboring points may be obtained according to the second neighboring points.

Step d: determining a matching point registered by each of the first key points according to the second feature vector of each of the first neighboring points of each of the first key points and the third feature vector of each of the second neighboring point of each of the candidate key points.

After the second feature vectors of the first neighboring points and the third feature vectors of the second neighboring points are obtained, at least one matching point may specifically be determined according to the second feature vectors of the first neighboring points, the third feature vectors of the second neighboring points and the matching point generating model.

Specifically, the matching point generating model may include but not limited to the feature extracting sub-model and the matching point generating sub-model. The feature extracting sub-model is used to extract features of the input data, and the matching point generating sub-model is used to generate a matching point according to the input data.

For each first key point, the first key point and the first neighboring points of the first key may be divided into one patch. The points in each patch may be converted into a local coordinate system with the first key point as the center. For each candidate key point of the second key points, the candidate key point and the second neighboring points of the candidate key point may be divided into one patch. The points in each patch may be converted into a local coordinate system with the candidate key point as the center.

For example, for each first key point in one or more first key points, relative coordinates of the first neighboring points relative to the first key point are determined according to coordinate of the first key point and coordinates of the first neighboring points of the first key point. In other words, relative coordinates of the first neighboring points in the coordinate system are determined with the first key point as the origin of the coordinate system. For each candidate key point in a second preset number of second candidate key points of the second key points in the one or more second key points, relative coordinates of the second neighboring points relative to the candidate key point are determined according to coordinate of the candidate key point and coordinates of the second neighboring points of the candidate key point. In other words, relative coordinates of the second neighboring points in the coordinate system are determined with the candidate key point as the origin of the coordinate system.

Optionally, after the relative coordinates of the first neighboring points and relative coordinates of the second neighboring points are determined, normalization processing may be further performed on the above relative coordinates.

For example, a fourth feature vector of a first key point may be obtained according to the second feature vectors of the first neighboring points of the first key point, and a fifth feature vector of a candidate key point may be obtained according to the third feature vectors of the second neighboring points of the candidate key point, and thus a similarity between the candidate key point of the second key point and the first key point corresponding to the second key point may be obtained according to the fourth feature vector and the fifth feature vector. Then, one or more matching points may be determined according to the similarity and the candidate key points.

After the second feature vectors of the first neighboring points and third feature vectors of the second neighboring points are obtained, the obtained relative coordinates and laser reflection intensity of the first neighboring points, the second feature vectors of the first neighboring points, the obtained relative coordinates and laser reflection intensity of the second neighboring points, and the third feature vectors of the second neighboring points are input into the feature extracting sub-module, to obtain the fourth feature vectors of the first key points and the fifth feature vectors of candidate key points of the second key points.

In some specific application scenarios, the above feature extracting sub-model may be an upconvolution neural network (UpconvNet). For example, the UpconvNet may include two tri-layer MLPs and one max-pooling layer. The first tri-layer MLP is used to learn a contributive weight of each neighboring point to a feature vector interpolation of the central point; the max-pooling layer is used to combine the contributive weight of each neighboring point to a feature vector interpolation of the central point by a max-pooling operation, to fuse feature vectors of all neighboring points; the second tri-layer MLP is used to refine the feature vectors of each neighboring point, to obtain the features of the central point of each patch, namely, the first key point or the feature vectors of the candidate key point.

After the fourth feature vectors of the first key points and fifth feature vectors of the candidate key points are obtained, a similarity between the candidate key points of the second key points and the first key points corresponding to the second key points may be obtained according to the fourth feature vectors of the first key points and fifth feature vectors of the candidate key points, and then the matching points registered by the first key points may be determined according to the similarity between the candidate key points of the second key points and the first key points corresponding to the second key points, and the candidate key points.

For example, after the fourth feature vectors of the first key points and fifth feature vectors of the candidate key points are obtained, the obtained fourth feature vectors, the fifth feature vectors and the candidate key points may be input into the matching point generating sub-model, to determine one or more matching points.

After the fourth feature vectors and fifth feature vectors are obtained, they, together with the candidate key points, may be input into the matching point generating sub-model, to determine one or more matching points.

A working principle of the above matching point generating sub-model is as follows: for each second key point in the one or more second key points, a similarity between each candidate key point of the second key point and the first key point corresponding to the second key point may be obtained according to the fourth feature vector of the first key point corresponding to the second key point and the fifth feature vector of the candidate key point of the second key point, and the one or more matching point, namely, the matching points registered by the first key point may be determined according to the obtained similarity and the second preset number of candidate key points of the second key point.

For example, a distance, such as a L2 distance, between the fifth feature vector of the candidate key point and the fourth feature vector of the corresponding first key point may be calculated, and a similarity may be determined according to the distance. Then, one or more matching point may be determined according to the obtained similarity and candidate key points.

In the embodiment, due to local sparsity of point cloud data, there might be no exact matching point corresponding to the first point cloud data in the second point cloud data. In the embodiment, the matching point generating sub-model is employed to generate, from the extracted features, the matching point corresponding to the first point cloud data, thereby improving the accuracy of the matching point.

The matching point generating sub-model may include a 3D neural network such as a 3D convolution neural network (3D CNN). The 3D neural network may perform dimension reduction processing on the input feature data (namely, the distances between the fifth feature vectors and the fourth feature vectors, e.g., L2 distances), to obtain finally a one-dimensional vector. A probability value (namely, similarity) may be obtained after allowing the one-dimensional vector to go through the excitation function softmax. The probability values and positions of the corresponding candidate key points are weighted to obtain a final matching point.

In the embodiment, due to local sparsity of point cloud data, there might be no exact matching point corresponding to the first point cloud data in the second point cloud data. In the embodiment, the matching point generating sub-model is employed to generate, from the extracted features, the matching point corresponding to the first point cloud data, thereby improving the accuracy of the matching point.

As such, the candidate matching points are determined based on grid voxels by drawing a 3D grid for the search space of the second point cloud data, and then the 3D neural network may be used to generate the matching point registered by the key points in the first point cloud data, thereby improving the accuracy of the registration of the first point cloud data and second point cloud data.

In an implementation, a second conversion parameter between a first key point and a matching point registered by the first key point may be determined according to each of the one or more first key points and the matching point registered by the first key point; then third key points corresponding to the first key points may be determined according to the first key points and the second conversion parameter corresponding to the first key points, and fourth key points corresponding to the first key points may be determined according to the first key points and a preset third conversion parameter between the second point cloud data and the first point cloud data; then, a loss function of the cloud point registration technology may be obtained according to the matching points registered by the first key points, the third key points corresponding to the first key points and the fourth key points corresponding to the first key points.

After the matching points are determined, the first key points may be regarded as a point set, and the matching points may be regarded as another point set. Then, the second conversion parameter between the two point sets is determined. For example, the above second conversion parameter may be solved in various ways, e.g., solved in a linear optimization manner or solved in a non-linear optimization manner. The linear optimization algorithm includes Singular Value Decomposition (SVD).

After the above second conversion parameter is obtained in various ways, the third key point corresponding to a first key point in the one or more first key points may be calculated. For example, the coordinate of the first key point may be multiplied by the second conversion parameter, and the obtained coordinate is the coordinate of the third key point.

In this implementation process, a preset third conversion parameter between the first point cloud data and the second point cloud data may further be obtained. The third conversion parameter differs from the first conversion parameter in that the first conversion parameter is obtained by calculating from the posture of an actually-mounted point cloud collecting device, and an error exists in it, whereas the third conversion parameter is obtained in other manners (e.g., emulation stimulation etc.). In other words, the third conversion parameter is taken as a real value, and the first conversion parameter is taken as a measurement value. For example, the coordinate of a first key point is multiplied by the third conversion parameter, and the obtained coordinate is the coordinate of the fourth key point.

In the implementation process, a loss function of the point cloud registration technology may be obtained according to the matching points registered by the first key points, the third key points corresponding to the first key points and the fourth key points corresponding to the first key points. For example, a weight coefficient may be assigned to each point set, and then the loss function of the point cloud registration technology may be determined according to the weight coefficients and the distances among the point sets.

For example, a first loss function may be determined according to at least one matching point and at least one fourth key point, a second loss function may be determined according to at least one third key point and at least one fourth key point, and then the loss function of the point cloud registration technology may be determined according to the first loss function, the second loss function and a preset balance factor.

In the implementation process, the first loss function $Loss_1$ may be determined firstly according to the matching points and the fourth key points. Then, the second loss function $Loss_2$ may be determined according to the third key points and fourth key points. Then, the loss function $Loss = \alpha \cdot Loss_1 + (1-\alpha) \cdot Loss_2$ may be obtained in conjunction with the balance factor $\alpha$, where $0 < \alpha < 1$.

The distance of points (e.g., the L2 distance in a Euclidean space) may be used as the first loss function. The first loss function $Loss_1$ may be represented by the following Equation:

$$Loss_1 = \frac{1}{n_m} \sum_{k=1}^{n_m} (p_{i,gt} - p_{i,cor})^2.$$

where $p_{i,gt}$ is the $i^{th}$ fourth key point, $p_{i,cor}$ is the $i^{th}$ matching point, and $i \in [1, n_m]$.

It may be seen from the above Equation that the first loss function $Loss_1$ performs registration on the independent pair of the first key point and matching point, and does not consider the association between other first key points and matching points. Hence, its registration result is certainly constrained by a global transformation.

The second loss function $Loss_2$ may be represented by the following Equation:

$$Loss_2 = \frac{1}{n_m} \sum_{i=1}^{n_m} (p_{i,gt} - (r_{ref} * p_i + t_{ref}))^2.$$

Where $p_{i,gt}$ is the $i^{th}$ fourth key point, $(r_{ref}, t_{ref})$ is the second conversion parameter, $p_i$ is the $i^{th}$ first key point, and $r_{ref}*p_i+t_{ref}$ is the $i^{th}$ third key point.

By the method for processing the point cloud data according to the above embodiment of the present disclosure, a uniform second conversion parameter may be determined for all the matching points, thereby optimizing the registration effect of the first point cloud data and second point cloud data.

In the embodiment, by pre-learning the feature vectors of respective points in the first point cloud data and second point cloud data, the feature vectors of the first key points may be determined directly based on the learnt second feature vectors of respective first neighboring points of the respective first key points in the first point cloud data, and the feature vectors of the candidate key points may be determined directly based on the learnt third feature vectors of the respective second neighboring points of respective candidate key points in the second point cloud data corresponding to the first key points. Therefore, there is no need to learn the feature vectors of the first key points according to respective first key points and their first neighboring points in the first point cloud data, or to learn the feature vectors of the candidate key points according to the respective candidate key points and their second neighboring points in the second point cloud data corresponding to the first key points. The number of points to be learnt may be effectively reduced, and the efficiency of point cloud registration may be improved.

In addition, according to the technical solution according to the present disclosure, the search space is determined by using the same grid voxels determined based on the second point cloud data, so that these identical grid voxels can be used to simplify the number of candidate key points and thereby simplify subsequent calculation.

In addition, the user experience can be effectively improved with the technical solutions according to the present disclosure.

It is to be noted that, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description are specific embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
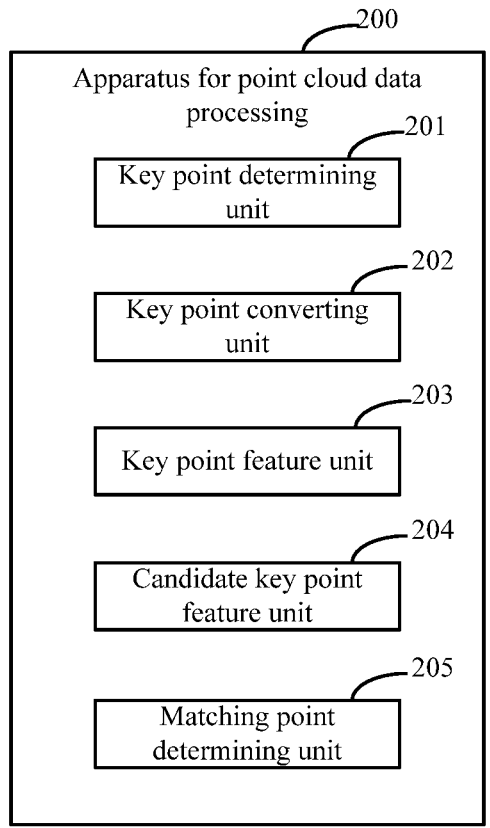
FIG. 2 is a schematic structural diagram of an apparatus for point cloud data processing according to an embodiment of the present disclosure.

FIG. 2 is a schematic structural diagram of an apparatus for point cloud data processing according to an embodiment of the present disclosure. As shown in FIG. 2, the apparatus for point cloud data processing according to the embodiment may include a key point determining unit 201, a key point converting unit 202, a key point feature unit 203, a candidate key point feature unit 204 and a matching point determining unit 205. The key point determining unit 201 is configured to obtain first feature vectors of respective points in first point cloud data, and determine one or more first key point in the respective points in the first point cloud data according to the first feature vectors of said respective points; the key point converting unit 202 is configured to obtain second key points in the second point cloud data corresponding respectively to respective first key points in the one or more first key points according to the one or more first key points and a preset first conversion parameter between the second point cloud data and the first point cloud data; where the first point cloud data and the second point cloud data are point cloud data of a same scenario obtained from different view angles; the key point feature unit 203 is configured to determine a first preset number of first neighboring points of each of the first key points according to the first point cloud data, and obtain a fourth feature vector of each of the first key points according to a second feature vector of each of the first neighboring points of each of the first key points; the candidate key point feature unit 204 is configured to determine a second preset number of candidate key points of each of the second key points corresponding to each of the first key points according to a preset search radius and a preset grid size; determine a first preset number of second neighboring points of each of the candidate key points according to the second point cloud data, and obtain a fifth feature vector of each of the candidate key points according to a third feature vector of each of the second neighboring points of each of the candidate key points; the matching point determining unit 205 is configured to determine a matching point registered by each of the first key points, according to the fourth feature vectors of each of the first key points and the fifth feature vector of each of the candidate key points.

It is to be noted that part or all of a subject for implementing the point cloud data processing apparatus according to the embodiment may be an application located at a local terminal, or be a function unit such as a plug-in or Software Development Kit (SDK) arranged in the application located at the local terminal, or be a processing engine located in a network-side server, or be a distributed system located on the network side, for example, a processing engine or a distributed system in a processing platform on the network side. This is not particularly limited in the embodiment.

It may be understood that the application may be a native application (nativeAPP) installed on the terminal, or a web application (webAPP) of a browser on the terminal. This is not limited in the embodiment.

Optionally, in a possible implementation of the embodiment, the key point feature unit 203 may be further configured to obtain the second feature vector of each of the first neighboring points of each of the first key points according to the first point cloud data by using a pre-created feature model.

Optionally, in a possible implementation of the embodiment, the candidate key point feature unit 204 may be further configured to obtain the fifth feature vector of each of the candidate key points according to the second point cloud data by using a pre-created feature model.

Optionally, in a possible implementation of the embodiment, the candidate key point feature unit 204 may be specifically further configured to determine a search space of each of the second key points according to the preset search radius by taking grid voxels closest to each of the second key points as a search center of each of the second key points, where grid voxels in the second point cloud data are determined according to the preset grid size; and determine central points of the second preset number of grid voxels in the search space of each of the second key points, as the candidate key points of each of the second key points corresponding to each of the first key points.

Optionally, in a possible implementation of the embodiment, the candidate key point feature unit 204 may be specifically configured to determine a repeated search space according to the search space of each of the second key points; and determine central points of the second preset number of grid voxels in the repeated search space as candidate key points for two or more second key points.

Optionally, in a possible implementation of the embodiment, the candidate key point feature unit 204 may be specifically configured to determine a search space of each of the second key points according to the preset search radius by taking each of the second key points as a search center of each of the second key points; determine the second preset number of grid voxels according to the preset grid size in the search space of each of the second key points; and determine central points of the second preset number of grid voxels as the candidate key points of each of the second key points corresponding to each of the first key points.

Optionally, in a possible implementation of the embodiment, the matching point determining unit 205 may be specifically configured to obtain a similarity between each of the candidate key points of each of the second key points and each of the first key points corresponding to each of the second key points, according to the fourth feature vector of each of the first key points and the fifth feature vector of each of the candidate key points; and determine the matching point registered by each of the first key points according to the similarity between each of the candidate key points of each of the second key points and each of the first key points corresponding to each of the second key points and each of the candidate key points.

It is to be noted that the method in the embodiment corresponding to FIG. 1 may be implemented by the apparatus for point cloud data processing according to this embodiment. Reference may be made to relevant content in the embodiment corresponding to FIG. 1 for detailed depictions.

In the embodiment, by pre-learning the feature vectors of respective points in the first point cloud data and second point cloud data, the key point feature unit may determine directly the feature vectors of the first key points based on the learnt second feature vectors of respective first neighboring points of the respective first key points in the first point cloud data, and the candidate key point feature unit may determine directly the feature vectors of the candidate key points based on the learnt third feature vectors of the respective second neighboring points of respective candidate key points in the second point cloud data corresponding to the first key points. Therefore, there is no need to learn the feature vectors of the first key points according to respective first key points and their first neighboring points in the first point cloud data, or to learn the feature vectors of the candidate key points according to the respective candidate key points and their second neighboring points in the second point cloud data corresponding to the first key points. The number of points to be learnt may be effectively reduced and the efficiency of point cloud registration may be improved.

In addition, according to the technical solution according to embodiments of the present disclosure, the search space is determined by using the same grid voxels determined based on the second point cloud data, so that these identical grid voxels may be used to simplify the number of candidate key points and thereby simplify subsequent calculation.

In addition, the user experience may be improved effectively with the technical solutions according to embodiments of the present disclosure.

According to embodiments of the present disclosure, an electronic device and a non-transitory computer-readable storage medium storing computer instructions therein are also proposed.

Figure 3:
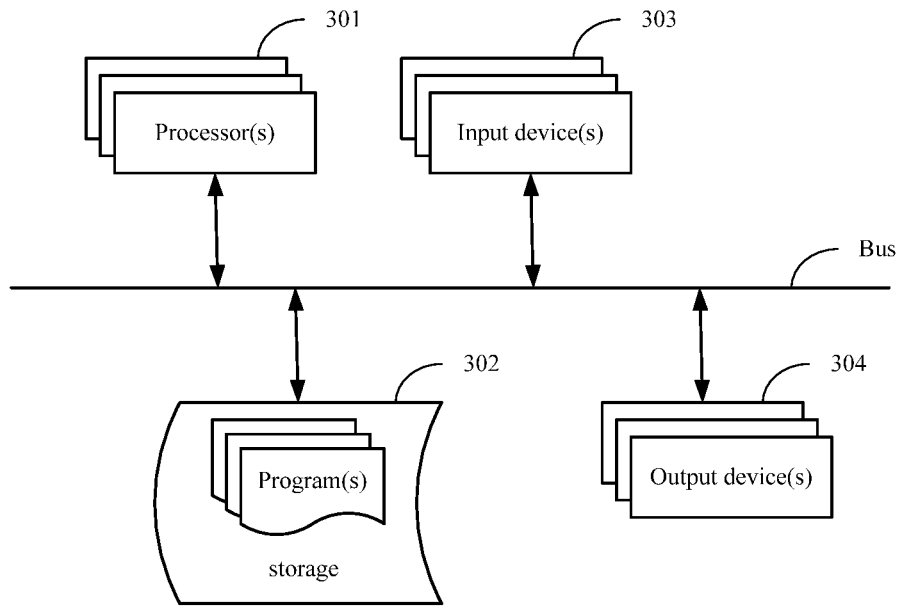
FIG. 3 is a schematic diagram of an electronic device for implementing a method for point cloud data processing according to an embodiment of the present disclosure.

As shown in FIG. 3, it shows a schematic diagram of an electronic device for implementing the point cloud data processing method according to an embodiment of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the disclosure described and/or claimed in the text here.

As shown in FIG. 3, the electronic device includes: one or more processors 301, a memory 302, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as displaycoupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 301 is taken as an example in FIG. 3.

The memory 302 is a non-transitory computer-readable storage medium provided by the present disclosure. Here, the memory stores instructions executable by at least one processor, so that the at least one processor executes the point cloud data processing method provided in the present disclosure. The non-transitory computer-readable storage medium of the present disclosure stores computer instructions, which are used to cause a computer to execute the point cloud data processing method provided by the present disclosure.

The memory 302 is a non-transitory computer-readable storage medium and can be used to store non-transitory software programs, non-transitory computer executable programs and modules, such as program instructions/modules corresponding to the point cloud data processing method in the embodiments of the present disclosure (for example, the key point determining unit 201, the key point converting unit 202, the key point feature unit 203, the candidate key point feature unit 204 and the matching point determining unit 205 as shown in FIG. 2). The processor 301 executes various functional applications and data processing of the server, i.e., implements the point cloud data processing method stated in the above method embodiment, by running the non-transitory software programs, instructions and modules stored in the memory 302.

The memory 302 may include a storage program region and a storage data region, where the storage program region may store an operating system and an application program needed by at least one function; the storage data region may store data created according to the use of the electronic device for implementing the point cloud data processing method according to the embodiments of the present disclosure. In addition, the memory 302 may include a high-speed random access memory, and may also include a non-transitory memory, such as at least one magnetic disk storage device, a flash memory device, or other non-transitory solid-state storage device. In some embodiments, the memory 302 may optionally include a memory remotely arranged relative to the processor 301, and these remote memories may be connected to the electronic device for implementing the point cloud data processing method according to embodiments of the present disclosure through a network. Examples of the above network include, but are not limited to, the Internet, an intranet, a local area network, a mobile communication network, and combinations thereof.

The electronic device for the point cloud data processing method may further include an input device 303 and an output device 304. The processor 301, the memory 302, the input device 303 and the output device 304 may be connected through a bus or in other manners. In FIG. 3, the connection through the bus is taken as an example.

The input device 303 may receive inputted numeric or character information and generate key signal inputs related to user settings and function control of the electronic device for the point cloud data processing method, and may be an input device such as a touch screen, keypad, mouse, trackpad, touchpad, pointing stick, one or more mouse buttons, trackball and joystick. The output device 404 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

According to technical solutions of embodiments of the present disclosure, by pre-learning the feature vectors of respective points in the first point cloud data and second point cloud data, the feature vectors of the first key points may be determined directly based on the learnt second feature vectors of respective first neighboring points of the respective first key points in the first point cloud data, and the feature vectors of the candidate key points may be determined directly based on the learnt third feature vectors of the respective second neighboring points of respective candidate key points in the second point cloud data corresponding to the first key points. Therefore, there is no need to learn the feature vectors of the first key points according to respective first key points and their first neighboring points in the first point cloud data, or to learn the feature vectors of the candidate key points according to the respective candidate key points and their second neighboring points in the second point cloud data corresponding to the first key points. The number of points to be learnt may be reduced effectively and the efficiency of point cloud registration may be improved.

In addition, according to the technical solutions according to embodiments of the present disclosure, the search space is determined by using the same grid voxels determined based on the second point cloud data, so that these identical grid voxels may be used to simplify the number of candidate key points and thereby simplify subsequent calculation.

In addition, the user experience may be effectively improved with the technical solutions according to embodiments of the present disclosure.

It should be understood that the various forms of processes shown above may be used to reorder, add, or delete steps. For example, the steps described in the present disclosure may be performed in parallel, sequentially, or in different orders as long as the desired results of the technical solutions disclosed in the present disclosure may be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for point cloud data processing, comprising:
   obtaining first feature vectors of respective points in first point cloud data, and determining one or more first key points in the respective points in the first point cloud data according to the first feature vectors of said respective points;
   obtaining second key points in second point cloud data corresponding respectively to respective first key points in the one or more first key points, according to the one or more first key points and a preset first conversion parameter between the second point cloud data and the first point cloud data; wherein the first point cloud data and the second point cloud data are point cloud data of a same scenario obtained from different view angles;
   determining a first preset number of first neighboring points of each of the first key points according to the first point cloud data, and obtaining a fourth feature vector of each of the first key points with a trained neural network feature extraction model according to a second feature vector of each of the first neighboring points of each of the first key points, relative coordinates and laser reflection intensity of the first neighboring points;
   determining a second preset number of candidate key points of each of the second key points corresponding to each of the first key points according to a preset search radius and a preset grid size; determining a first preset number of second neighboring points of each of the candidate key points according to the second point cloud data, and obtaining a fifth feature vector of each of the candidate key points with the trained neural network feature extraction model according to a third feature vector of each of the second neighboring points of each of the candidate key points, relative coordinates and laser reflection intensity of the second neighboring points; and
   determining a matching point registered by each of the first key points, according to the fourth feature vector of each of the first key points and the fifth feature vector of each of the candidate key points.

2. The method according to claim 1, wherein before the obtaining a fourth feature vector of each of the first key points according to a second feature vector of each of the first neighboring points of each of the first key points, the method further comprises:
   obtaining the second feature vector of each of the first neighboring points of each of the first key points according to the first point cloud data by using a pre-created feature model.

3. The method according to claim 1, wherein before the obtaining a fifth feature vector of each of the candidate key points according to a third feature vector of each of the second neighboring points of each of the candidate key points, the method further comprises:
   obtaining the fifth feature vector of each of the candidate key points according to the second point cloud data by using a pre-created feature model.

4. The method according to claim 1, wherein the determining a second preset number of candidate key points of each of the second key points corresponding to each of the first key points according to a preset search radius and a preset grid size comprises:
   determining a search space of each of the second key points according to the preset search radius by taking grid voxels closest to each of the second key points as a search center of each of the second key points, wherein grid voxels in the second point cloud data are determined according to the preset grid size; and
   determining central points of the second preset number of grid voxels in the search space of each of the second key points, as the candidate key points of each of the second key points corresponding to each of the first key points.

5. The method according to claim 4, wherein the determining a second preset number of candidate key points of each of the second key points corresponding to each of the first key points according to a preset search radius and a preset grid size further comprises:
   determining a repeated search space according to the search space of each of the second key points; and
   determining central points of the second preset number of grid voxels in the repeated search space as candidate key points for two or more second key points.

6. The method according to claim 1, wherein the determining a second preset number of candidate key points of each of the second key points corresponding to each of the first key points according to a preset search radius and a preset grid size comprises:
   determining a search space of each of the second key points according to the preset search radius by taking each of the second key points as a search center of each of the second key points;
   determining the second preset number of grid voxels according to the preset grid size in the search space of each of the second key points; and
   determining central points of the second preset number of grid voxels as the candidate key points of each of the second key points corresponding to each of the first key points.

7. The method according to claim 1, wherein the determining a matching point registered by each of the first key points, according to the fourth feature vectors of each of the first key points and the fifth feature vectors of each of the candidate key points comprises:
   obtaining a similarity between each of the candidate key points of each of the second key points and each of the first key points corresponding to each of the second key points, according to the fourth feature vector of each of the first key points and the fifth feature vector of each of the candidate key points; and
   determining the matching point registered by each of the first key points according to the similarity between each of the candidate key points of each of the second key points and each of the first key points corresponding to each of the second key points and each of the candidate key points.

8. An electronic device, comprising:
at least one processor; and
a memory communicatively connected with the at least one processor; wherein,
the memory stores instructions executable by the at least one processor, and the instructions are executed by the at least one processor to enable the at least one processor to perform a method for point cloud data processing, which comprises:
obtaining first feature vectors of respective points in first point cloud data, and determining one or more first key points in the respective points in the first point cloud data according to the first feature vectors of said respective points;
obtaining second key points in second point cloud data corresponding respectively to respective first key points in the one or more first key points, according to the one or more first key points and a preset first conversion parameter between the second point cloud data and the first point cloud data; wherein the first point cloud data and the second point cloud data are point cloud data of a same scenario obtained from different view angles;
determining a first preset number of first neighboring points of each of the first key points with a trained neural network feature extraction model according to the first point cloud data, and obtaining a fourth feature vector of each of the first key points according to a second feature vector of each of the first neighboring points of each of the first key points, relative coordinates and laser reflection intensity of the first neighboring points;
determining a second preset number of candidate key points of each of the second key points corresponding to each of the first key points according to a preset search radius and a preset grid size; determining a first preset number of second neighboring points of each of the candidate key points according to the second point cloud data, and obtaining a fifth feature vector of each of the candidate key points with the trained neural network feature extraction model according to a third feature vector of each of the second neighboring points of each of the candidate key points, relative coordinates and laser reflection intensity of the second neighboring points; and
determining a matching point registered by each of the first key points, according to the fourth feature vector of each of the first key points and the fifth feature vector of each of the candidate key points.

9. The electronic device according to claim 8, wherein before the obtaining a fourth feature vector of each of the first key points according to a second feature vector of each of the first neighboring points of each of the first key points, the method further comprises:
obtaining the second feature vector of each of the first neighboring points of each of the first key points according to the first point cloud data by using a pre-created feature model.

10. The electronic device according to claim 8, wherein before the obtaining a fifth feature vector of each of the candidate key points according to a third feature vector of each of the second neighboring points of each of the candidate key points, the method further comprises:
obtaining the fifth feature vector of each of the candidate key points according to the second point cloud data by using a pre-created feature model.

11. The electronic device according to claim 8, wherein the determining a second preset number of candidate key points of each of the second key points corresponding to each of the first key points according to a preset search radius and a preset grid size comprises:
determining a search space of each of the second key points according to the preset search radius by taking grid voxels closest to each of the second key points as a search center of each of the second key points, wherein grid voxels in the second point cloud data are determined according to the preset grid size; and
determining central points of the second preset number of grid voxels in the search space of each of the second key points, as the candidate key points of each of the second key points corresponding to each of the first key points.

12. The electronic device according to claim 11, wherein the determining a second preset number of candidate key points of each of the second key points corresponding to each of the first key points according to a preset search radius and a preset grid size further comprises:
determining a repeated search space according to the search space of each of the second key points; and
determining central points of the second preset number of grid voxels in the repeated search space as candidate key points for two or more second key points.

13. The electronic device according to claim 8, wherein the determining a second preset number of candidate key points of each of the second key points corresponding to each of the first key points according to a preset search radius and a preset grid size comprises:
determining a search space of each of the second key points according to the preset search radius by taking each of the second key points as a search center of each of the second key points;
determining the second preset number of grid voxels according to the preset grid size in the search space of each of the second key points; and
determining central points of the second preset number of grid voxels as the candidate key points of each of the second key points corresponding to each of the first key points.

14. The electronic device according to claim 8, wherein the determining a matching point registered by each of the first key points, according to the fourth feature vectors of each of the first key points and the fifth feature vectors of each of the candidate key points comprises:
obtaining a similarity between each of the candidate key points of each of the second key points and each of the first key points corresponding to each of the second key points, according to the fourth feature vector of each of the first key points and the fifth feature vector of each of the candidate key points; and
determining the matching point registered by each of the first key points according to the similarity between each of the candidate key points of each of the second key points and each of the first key points corresponding to each of the second key points and each of the candidate key points.

15. A non-transitory computer-readable storage medium storing computer instructions therein, wherein the computer instructions are used to cause the computer to perform a method for point cloud data processing, which comprises:
obtaining first feature vectors of respective points in first point cloud data, and determining one or more first key points in the respective points in the first point cloud data according to the first feature vectors of said respective points;

obtaining second key points in second point cloud data corresponding respectively to respective first key points in the one or more first key points, according to the one or more first key points and a preset first conversion parameter between the second point cloud data and the first point cloud data; wherein the first point cloud data and the second point cloud data are point cloud data of a same scenario obtained from different view angles;

determining a first preset number of first neighboring points of each of the first key points according to the first point cloud data, and obtaining a fourth feature vector of each of the first key points with a trained neural network feature extraction model according to a second feature vector of each of the first neighboring points of each of the first key points, relative coordinates and laser reflection intensity of the first neighboring points;

determining a second preset number of candidate key points of each of the second key points corresponding to each of the first key points according to a preset search radius and a preset grid size; determining a first preset number of second neighboring points of each of the candidate key points according to the second point cloud data, and obtaining a fifth feature vector of each of the candidate key points with the trained neural network feature extraction model according to a third feature vector of each of the second neighboring points of each of the candidate key points, relative coordinates and laser reflection intensity of the second neighboring points; and determining a matching point registered by each of the first key points, according to the fourth feature vector of each of the first key points and the fifth feature vector of each of the candidate key points.

16. The non-transitory computer-readable storage medium according to claim 15, wherein before the obtaining a fourth feature vector of each of the first key points according to a second feature vector of each of the first neighboring points of each of the first key points, the method further comprises:

obtaining the second feature vector of each of the first neighboring points of each of the first key points according to the first point cloud data by using a pre-created feature model.

17. The non-transitory computer-readable storage medium according to claim 15, wherein before the obtaining a fifth feature vector of each of the candidate key points according to a third feature vector of each of the second neighboring points of each of the candidate key points, the method further comprises:

obtaining the fifth feature vector of each of the candidate key points according to the second point cloud data by using a pre-created feature model.

18. The non-transitory computer-readable storage medium according to claim 15, wherein the determining a second preset number of candidate key points of each of the second key points corresponding to each of the first key points according to a preset search radius and a preset grid size comprises:

determining a search space of each of the second key points according to the preset search radius by taking grid voxels closest to each of the second key points as a search center of each of the second key points, wherein grid voxels in the second point cloud data are determined according to the preset grid size; and determining central points of the second preset number of grid voxels in the search space of each of the second key points, as the candidate key points of each of the second key points corresponding to each of the first key points.

19. The non-transitory computer-readable storage medium according to claim 18, wherein the determining a second preset number of candidate key points of each of the second key points corresponding to each of the first key points according to a preset search radius and a preset grid size further comprises:

determining a repeated search space according to the search space of each of the second key points; and determining central points of the second preset number of grid voxels in the repeated search space as candidate key points for two or more second key points.

20. The non-transitory computer-readable storage medium according to claim 15, wherein the determining a second preset number of candidate key points of each of the second key points corresponding to each of the first key points according to a preset search radius and a preset grid size comprises:

determining a search space of each of the second key points according to the preset search radius by taking each of the second key points as a search center of each of the second key points;

determining the second preset number of grid voxels according to the preset grid size in the search space of each of the second key points; and determining central points of the second preset number of grid voxels as the candidate key points of each of the second key points corresponding to each of the first key points.

* * * * *